(12) United States Patent
Bishop et al.

(10) Patent No.: US 9,679,473 B2
(45) Date of Patent: Jun. 13, 2017

(54) ILLUMINATION APPARATUS METHODS AND SYSTEMS

(75) Inventors: Daniel John Bishop, Victoria (AU); Geoffrey Kenneth Andrews, Victoria (AU)

(73) Assignee: OR Technologies Pty Ltd, Melbourne Airport (AU)

( * ) Notice: Subject to any disclaimer, the term of this patent is extended or adjusted under 35 U.S.C. 154(b) by 665 days.

(21) Appl. No.: 13/643,259

(22) PCT Filed: Apr. 21, 2011

(86) PCT No.: PCT/AU2011/000459
§ 371 (c)(1),
(2), (4) Date: Oct. 29, 2012

(87) PCT Pub. No.: WO2011/134003
PCT Pub. Date: Nov. 3, 2011

(65) Prior Publication Data
US 2013/0038224 A1     Feb. 14, 2013

(30) Foreign Application Priority Data

Apr. 26, 2010 (AU) ................ 2010901746

(51) Int. Cl.
  *H05B 33/08*    (2006.01)
  *G08C 23/04*    (2006.01)
  *H05B 37/02*    (2006.01)

(52) U.S. Cl.
  CPC ......... *G08C 23/04* (2013.01); *H05B 37/0218* (2013.01); *H05B 37/0227* (2013.01);
  (Continued)

(58) Field of Classification Search
  USPC ....... 315/129, 130, 131, 132, 133, 291, 297, 315/307, 312
  See application file for complete search history.

(56) References Cited

U.S. PATENT DOCUMENTS

| 5,220,250 A | 6/1993 | Szuba |
| 7,529,594 B2 | 5/2009 | Walters et al. |
| (Continued) | | |

FOREIGN PATENT DOCUMENTS

| CN | 101513128 A | 8/2009 |
| JP | 07312294 | 11/1995 |
| (Continued) | | |

OTHER PUBLICATIONS

Supplementary European Search Report in corresponding application EP 11774184, mailed Mar. 12, 2014, 1 page.
(Continued)

*Primary Examiner* — Douglas W Owens
*Assistant Examiner* — Jianzi Chen
(74) *Attorney, Agent, or Firm* — Harness, Dickey & Pierce, P.L.C.

(57) ABSTRACT

The present invention provides apparatus and methods for controlling the illumination throughout an area where even and constant lighting is not required. The invention includes one or more light sources, such as luminaires, the status of which is controlled by a controller responsive to a sensor for detecting a parameter of interest. Preferably the sensor detects motion of a subject moving through the area of controlled illumination. Each independent controller may receive and transmit signals indicative of the status of one or more nearby light source for determining and controlling the lighting status of the light source with which it is in controlling communication. The determining by the controller is preferably carried out by a programmed microprocessor. The communication between controllers may be wireless. The signals communicated among controllers may be hierarchical for determining whether a response is required and what the response might be.

28 Claims, 5 Drawing Sheets

(52) U.S. Cl.
CPC ..... *H05B 37/0272* (2013.01); *G08C 2201/51* (2013.01); *Y02B 20/44* (2013.01); *Y02B 20/46* (2013.01)

(56) References Cited

U.S. PATENT DOCUMENTS

| | | |
|---|---|---|
| 7,633,406 B2 | 12/2009 | Miki |
| 2008/0258646 A1 | 10/2008 | Beij et al. |
| 2010/0060173 A1 | 3/2010 | Scharf |
| 2010/0201267 A1* | 8/2010 | Bourquin ........... H05B 37/0245 315/32 |

FOREIGN PATENT DOCUMENTS

| | | |
|---|---|---|
| JP | 09283282 | 10/1997 |
| JP | 11214167 | 8/1999 |
| JP | 2003234197 | 8/2003 |
| JP | 2009054496 | 3/2009 |
| WO | 2009003279 A1 | 1/2009 |
| WO | 2009137041 A1 | 11/2009 |
| WO | WO2010/124315 A1 | 11/2010 |
| WO | WO2010/057313 A1 | 5/2011 |
| WO | WO2011/134003 A1 | 11/2011 |

OTHER PUBLICATIONS

International Search Report for PCT/AU2011/00459, mailed Aug. 25, 2011; ISA/AU.
Fifth Chinese Office Action dated Jun. 1, 2016, corresponding to Chinese Application No. 2011800286395. Non-English.
Examination Report issued Dec. 12, 2016 in the corresponding EP application.

\* cited by examiner

ID: 9,679,473 B2

ILLUMINATION APPARATUS METHODS AND SYSTEMS

CROSS-REFERENCE TO RELATED APPLICATIONS

This application is a 371 U.S. National Stage of International Application No. PCT/AU2011/000459, filed on Apr. 21, 2011, which claims priority to Australian Patent Application No. 2010901746, filed on Apr. 26, 2010. The contents of the above applications are incorporated herein by reference in their entirety

RELATED APPLICATION

This application claims the priority and benefit of Australian Provisional Application No. 2010901746, filed on 26 Apr. 2010.

FIELD OF THE INVENTION

This invention relates to electrical control systems and, in particular, to lighting control.

BACKGROUND

A common problem that exists for those responsible for managing large buildings such as factories, warehouses and offices, is energy wastage. It is desirable to reduce energy consumption as much as possible while ensuring that normal activities may proceed with little or no disturbance. Efficient control of lighting is a common goal for building managers.

Various attempts have been made to control lighting based on the presence of personnel or activities in a given area. In the simplest instance, personnel manually turn on and off lighting in the area they are entering and leaving. This has the disadvantage that normal activity may be interrupted by this process and this may even pose a safety hazard, especially if the person in question is handling materials that may be hazardous but must set down and picked up in order to turn on and off the lights.

In a well known solution to control lighting in situations such as described above, a person may be required to activate a time-delayed switch which causes the lights to be turned on and then turn off automatically after a predetermined time, said time being sufficient for the person to carry out the required activity and leave the lighted area. This has the disadvantage that if the person requires more time than the pre-programmed 'on' time, they may be left without light, presenting a safety hazard.

Another common approach, as disclosed by Szuba in U.S. Pat. No. 5,220,250, is to activate lights based on detecting the presence of personnel using a sensor. The sensor may be one of a number of types, such as a microwave sensor, a passive infrared sensor or ultrasonic sensor, each usually activated by the movement of personnel in a particular area. The sensors may be attached to individual luminaires or may be separately placed to detect movement and activate individual luminaires or otherwise a plurality of luminaires representing zones of illumination, such as a section of a warehouse.

There are major drawbacks to the aforementioned detection approach. In the case of the first instance, wherein each luminaire is controlled by its own sensor, the problem is that, although it is very energy efficient, the area illuminated is too small for normal human activity and is therefore undesirable. In the second case, where a sensor activates a number of luminaires, it is necessary to wire the luminaires into zones which are activated by the sensor. The delineation of such zones is determined during initial installation and commissioning and may, after a period of time, not relate usefully to the changing needs for illumination as changes occur in the boundaries of activities required to be undertaken by personnel. For example, the relocation of an assembly line may result in it overlapping two lighting zones making it impossible to optimize the efficiency of the lighting system.

In more recent times, there has been an attempt to optimize lighting in buildings using computerized building management systems as taught by Huizenga (U.S. Pat. No. 7,623,042). Such systems are able to receive inputs from sensors placed in a building and perform logical operations to turn on and off facilities such as heating and lighting. In this case, the system suffers the disadvantage of the cost of wireless links required to provide the logical connectivity between luminaires, sensors and the control unit. For systems where the sensing information and power control are provided over wires, there is a considerable cost associated with the installation of said wiring. In all such cases the cost of the control units and separate sensors add further to the cost burden. A further disadvantage is that, as with other centralized systems, the luminaires are wired into zones during commissioning. Such zones are normally as large as possible as this minimizes the cost of wiring and the cost of interfaces. As a result the granularity of control of lighting is limited to the size of the zones which limits the extent to which energy usage may be optimized.

A very common drawback of automatic lighting control systems is that at the cessation of activity, and usually after a further delay period, the luminaires are turned off. This has a very distracting effect on personnel working nearby. Although the area that the person is working in may be well illuminated, sudden changes in peripheral illumination may cause distraction and negative safety or productivity effects. What is needed are improved apparatus, methods and systems for illuminating specified areas more efficiently and cost-effectively than those currently known.

SUMMARY OF THE INVENTION

The present invention provides apparatus, methods and systems for the control of illumination of an area. It is an object of the invention to provide illumination in areas only when the areas are occupied or other times when illumination is needed and to control the provided illumination. In one aspect, the invention provides apparatus comprising of a sensor for detecting changes in a parameter indicative of activity of interest, a limited-range signal transmission means, a detection means for receiving transmitted signals, a controller, and a light source. Preferably, the activity of interest is human presence. Preferably, the sensor is a motion detection means. Alternatively, the sensor may detect radiation. Preferably, the light source is a luminaire, known in the art as comprising of a housing, a light source, a power source, control gear, and other elements such as light diffusers, timers, sensors, and the like. A luminaire may incorporate a plurality of sensors for sensing a plurality of parameters. The signal transmission means may send and detect signals. The signals may be coded.

In another aspect, the invention provides a method of illuminating areas selectively over space and time. The method comprises the steps of: sensing a first change in a parameter indicative of human presence, illuminating a first area, transmitting the state of illumination from a first area to at least a second area, determining whether to illuminate at least a second area according to pre-determined criteria, and illuminating at least a second area according to the pre-determined criteria. Preferably, the step of sensing detects motion. Alternatively, the step of sensing may detect heat radiation, temperature or another parameter of interest. The method may include the step of determining a second change in a parameter indicative of human presence. The method may include the step of determining whether to cease illumination according to pre-determined criteria. The method may include the step of making a plurality of determinations leading to some areas being illuminated and some areas are not. Preferably, the step of determining is carried out by a controller. Preferably, the controller includes a microprocessor programmed for carrying out the step of determining. Preferably, the step of sensing is carried out by a signal detection means. Preferably, the step of transmitting is carried out by infrared broadcasting. The method may include illuminating the areas with electric light sources. Preferably the light sources are luminaires. The step of transmitting may include transmitting signals. Preferably the signals are coded. The signal coding may be classified according to a classification scheme. The classification scheme may incorporate at least one classification category or levels. Preferably, the classification scheme comprises of a plurality of categories or levels. A category may be defined by a hierarchical relationship of signals transmitted by a plurality of controllers. Most preferably the hierarchical relationship is associated with receiving controllers. Most preferably, the hierarchical relationship comprises of a plurality of levels.

The invention includes an illumination system for providing illumination for certain areas wherein the system comprises of a plurality of light sources which are independently operable and controllable by a controller or a plurality of controllers in communication with the light sources.

DETAILED DESCRIPTION OF THE FIGURES AND PREFERRED EMBODIMENT

Figure 1:
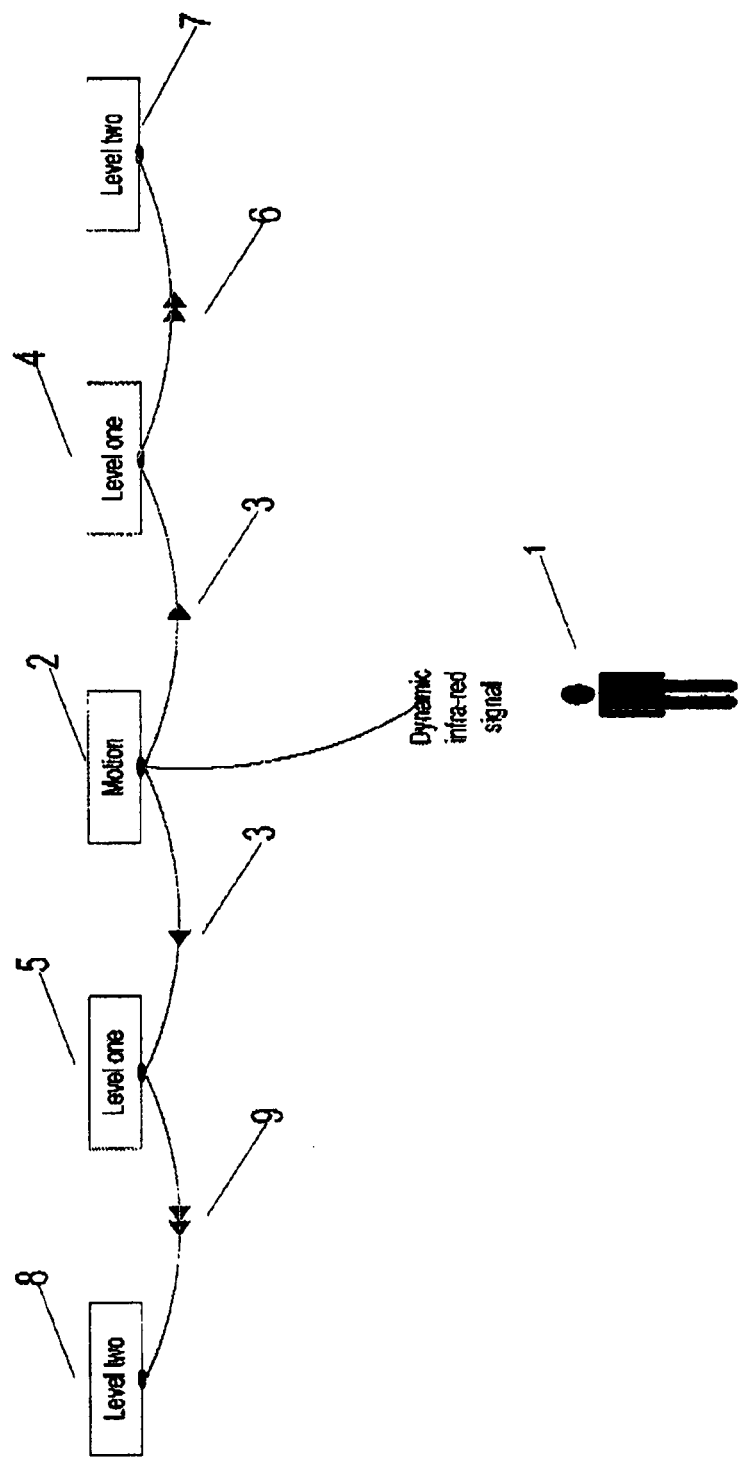
FIG. 1 shows a system of light sources, shown as luminaires, arranged in an illumination system according to the invention.

The invention comprises a method and system for the control of illumination of a lighting system where the invention comprises of at least one sensor for detecting a parameter, a communications means, a detection means to receive said broadcast communications, a controller and a light source. Preferably the communication means transmits and/or receives limited-range signals. Preferably, the light source comprises of a luminaire as known in the art of lighting. However, other light sources may be used. The preferred embodiment described herein includes light sources being luminaires but it will be understood that any suitable light source may be incorporated into an embodiment of the invention. Preferably, the sensor is a motion detection means. However, other indicators may be used such as radiation sensors. Preferably, the motion detection means detects the motions of humans. The communications means transmits and receives signals. Preferably the signals are classified or coded. Preferably, the classification includes a plurality of categories. Preferably, the categories denominate a series of levels. Preferably, the level represents a numerical hierarchy for comparison by receiving controllers. In various aspects, the present invention may provide illumination localized to areas where there is activity of interest, or adjacent to activity of interest, depending on the nature of the expected activity in the areas. When a motion detection means associated with a luminaire detects the presence of activity it provides a signal which is input to a controller. As a consequence of the activation of this input signal, the controller may provide an output signal to activate the light source within the luminaire. The activated light source therefore provides illumination for the person undertaking the activity. Also, in response to the input signal, the controller may activate a short-range communications means to broadcast a signal. Preferably, the signal is coded as a level-one broadcast signal. The invention includes combinations of light sources, each of which may or may not include a controller. For example, two light sources may be controlled by a common controller to illuminate a larger area as and when needed. Similarly, a plurality of light sources may be controlled by a single controller. Embodiments of the invention include multiple light sources configured and controlled with multiple controllers to control the illumination of particular areas as desired. The light sources need not to be the same and may be a combination of types of light source.

This signal may be received by communication means incorporated into or in controlling communication with nearby luminaires, each of which will consequently both turn on their light sources according to a programmed controller and transmit a signal, which is coded as a level two broadcast signal. Consequent to receiving this level two signal, controllers for nearby luminaires that have not already received a level one signal may turn on their light sources and may cause the transmission of a level three signal, and so on. The controller controlling a light source such as a luminaire may be programmed to respond to only a limited range of signal levels of signal transmissions and in a particular order of transmission, so that the area of illumination activated by an activity of interest in response to a motion detection event is limited. For example, a controller in communication with a luminaire, the controller programmed to turn its light source on in response to signals categorized as level-one and level-two signals, may be programmed to only transmit a higher level signal in response to a level-one signal. If a level-two signal is received by a controller for a luminaire it will not broadcast a signal in response.

This has the effect of imposing a boundary of illumination limited to luminaries that receive the level-two broadcast signals. Since each transmitter is of limited range, the combination of the transmission level, being either level-one or level-two signals, and the limited distance range of the broadcast signal naturally limits the distance from the original motion-detecting means associated with a luminaire to the furthest activated luminaire from the original activity of interest.

Each luminaire may be programmed to emit a certain light level, upon receiving of any of the motion, level one, level two and so on, signals. For example, a system may comprise of simply a motion level signal, and a level one signal. In this case the system will only respond differently to a motion signal, or a signal from a neighbouring luminaire. A level one signal would just be received and transmitted whether the particular luminaire is directly adjacent to a luminaire in "motion" mode, or any distance from the luminaire sensing the motion. In this case, the level would preferably be set at 1, in which case a luminaire would transmit a level 1 signal upon receipt of a subject present signal, or a level 1 signal.

The method may also include a programmable dwell-time for the illumination to stay at a level, or subsequent reduced level after the received signal terminates.

It is clear from the above description that the extent of the illuminated area may be controlled by programming the controller for each luminaire with a limit to the transmission signal level to which it will respond, and programmable behavior for each of the signal levels. For example, a system where the luminaires respond only to a level-one signal will be smaller than an otherwise similar system wherein the luminaires are programmed to respond to signals up to levels two, three, four, and so on.

An exemplary embodiment of the invention is described now with reference to FIG. 1. The presence of a subject (1) is detected by a first sensor in a first luminaire (2). A controller in communication with said first sensor in said first luminaire (2) turns on its light source and transmits a level-one broadcast signal (3) which is detected by detection means in nearby, secondary luminaires (4 and 5). It will be understood that the detection means can be any commonly available receiver for transmitted signals. The controllers associated with a second, third, or more nearby luminaires (4 and 5) turn on their light sources and transmit level-two signals (6) which are detected by other nearby luminaires (7 and 8) and by the originating or first luminaire (2). The originating, or first, luminaire is programmed to not respond to this signal as it is has already transmitted a lower-level signal. The controllers in the luminaires (7 and 8) that have detected the level two broadcast signals (6) turn on their light sources. Since all luminaires have been programmed to transmit a signal only on reception of a level-one signal, luminaires 7 and 8 do not broadcast a signal so no further luminaires are activated.

It will be understood that there are many variations possible of the steps of the method described above. In a variation of the above method, luminaires may be programmed to transmit the next level signal regardless of the received signal numerical level, provided it has not already transmitted a lower or equal level signal. For example, a luminaire may initially be idle, having received no signal for a period of time. If it receives a level N signal (where N is any integer) it will transmit a signal of order N+1. This behaviour allows alternate light patterns to be formed that may be of advantage. For example, luminaires may respond to signals as follows.

If the luminaire is idle (no signals received for a period of time) and the first received signal is level N (where N is 1 or 2), the controller turns on its light source to full intensity, and the luminaire transmits a level N+1 signal.

If the luminaire is idle and the first received signal is of level M (where M is 3 or 4) then the luminaire may turn on its light source to half intensity and transmits a level M+1 signal.

The signal levels increase with distance and are transmitted without limit to all luminaires within communication distance of a transmitter.

The controllers of some luminaires may be programmed to respond to any level signal. This is advantageous if it desired to illuminate walkways, entry and exit corridors, emergency access points etc, whenever anyone is anywhere in the general area, providing safety illumination as well as efficient localized illumination of an area where activity is occurring. A controller for a luminaire is most conveniently incorporated into the luminaire. However, it will be understood that a controller not incorporated into the luminaire may be spaced from it, but in communication with it. Further, a controller may control more than one luminaire, as required by the system dimensions and the area required to be illuminated.

Most advantageously, the invention the apparatus preferably includes short-range wireless signal communication between transmission and detection means associated with a luminaire. In the case of wireless transmission, the transmission and detection means may be any means that is capable of transmitting a signal over a limited distance. Common means for short-range communications include infrared links, ultrasonic links, low-power radio links etc. However, the scope of the invention also includes the transmission of signals between detection means that are hard wired. The invention includes means to modulate the main light source on a luminaire. For example, it is known to those skilled in the art that it is readily possible to modulate the light output of a fluorescent tube if it is driven by a suitable designed driver circuit which can respond quickly to its intensity-setting input.

Figure 2:
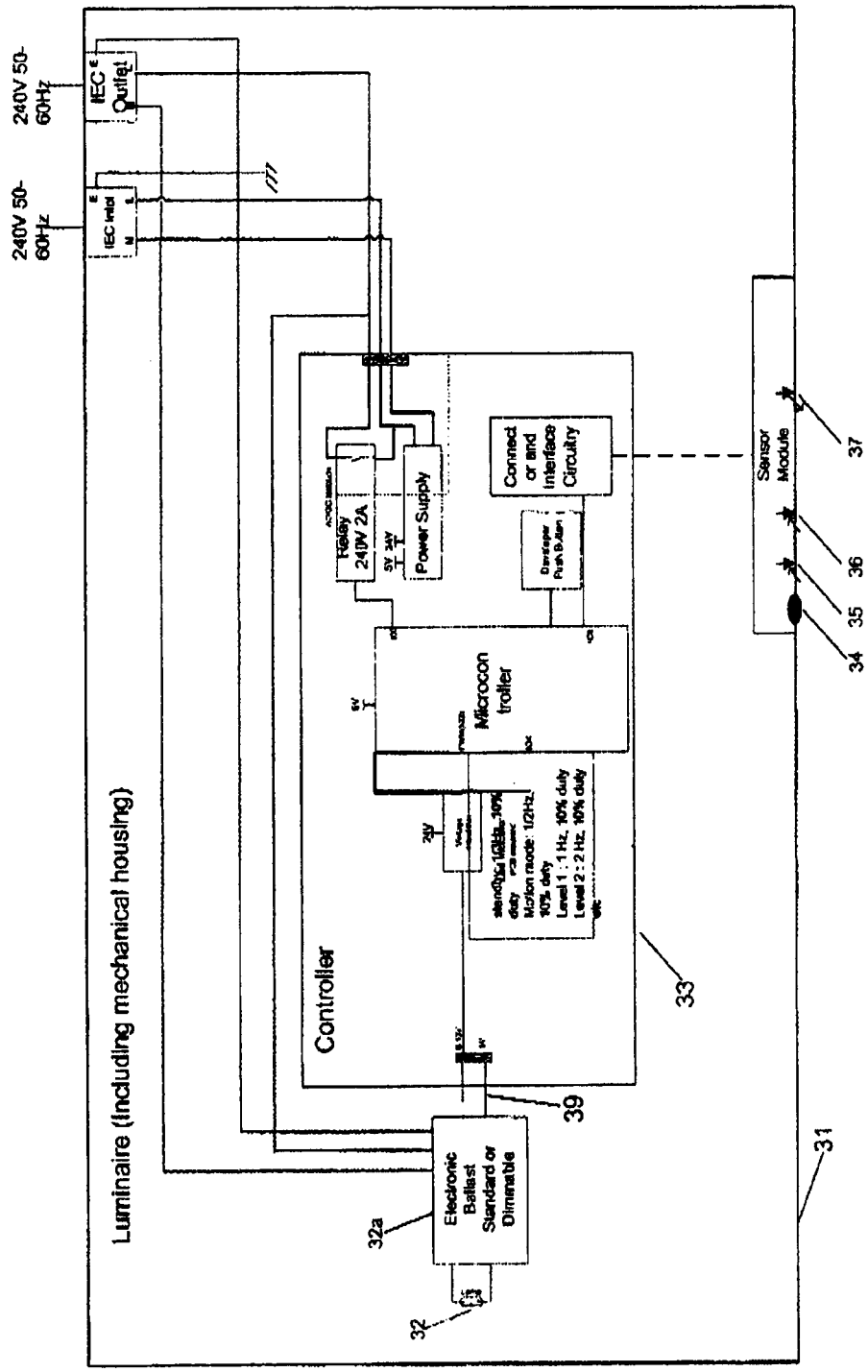
FIG. 2 shows a block diagram of the illumination system showing the essential components and the relationship between them.

A description of the preferred embodiment is now provided. With reference to FIG. 2, the invention is preferably implemented as a luminaire consisting of a housing (31) containing a light source, which is preferably a fluorescent tube (32), along with an electronic ballast (32a) to correctly drive the fluorescent tube at a plurality of selectable luminosity levels, a controller (3) a motion detector based on passive infrared technology (34) a first photo-detector for detecting ambient light levels (35) a second photo-detector, capable of detecting radiation in the near infrared (36) for receiving infrared communication signals and a light-emitting diode (37) whose dominant wavelength in the near-infrared for transmitting infrared communications signals.

Figure 5:
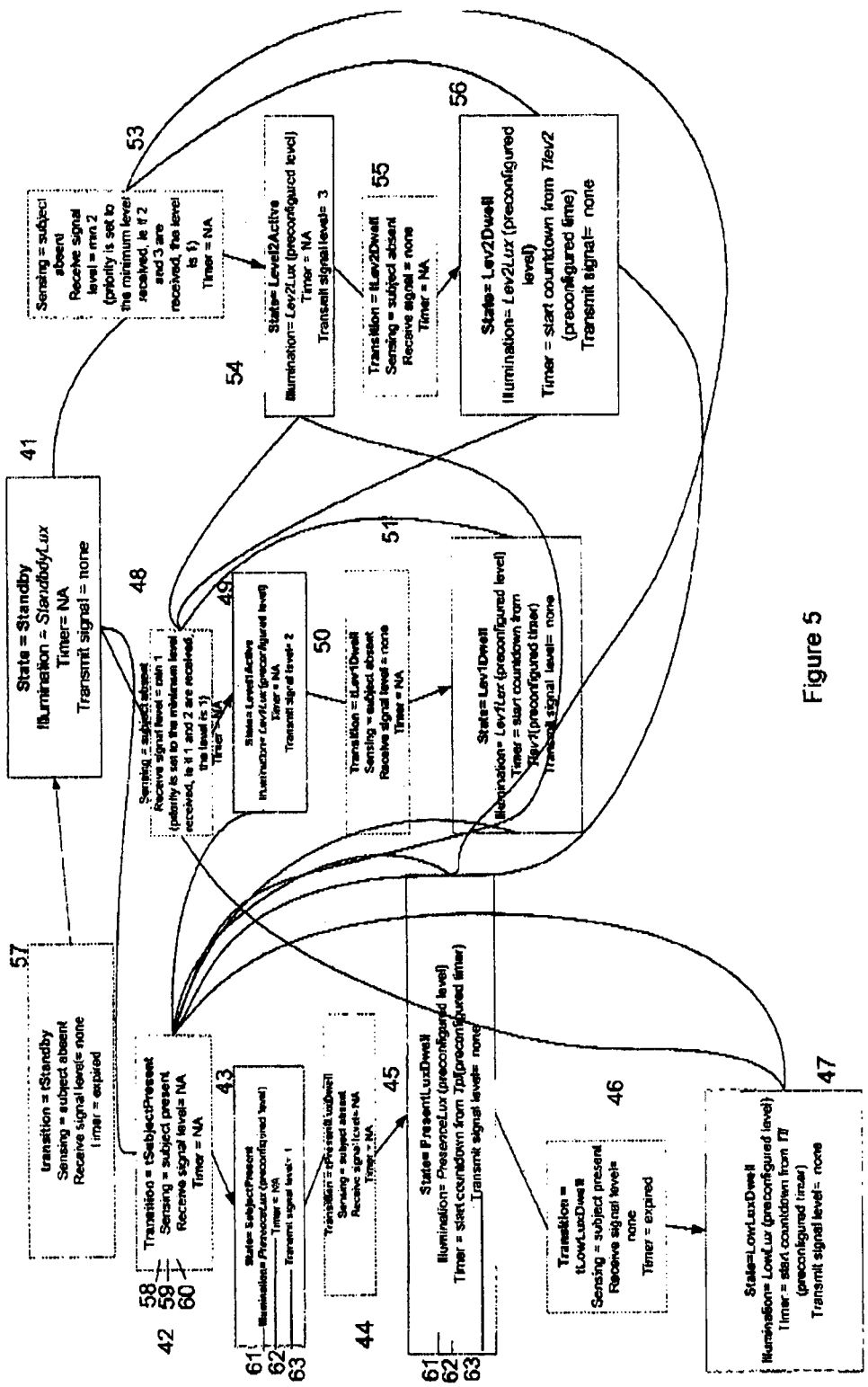
FIG. 5 shows a flowchart describing the algorithm implemented in each of the light sources in an illumination system.

Said controller controls said electronic ballast as required to adjust the luminosity of said light source in accordance with the steps of an algorithm described in FIG. 5 based on ambient light, detected motion, incoming infrared communications, and time. Therefore, said controller takes as inputs signals from the first and second photo-detectors and motion detector, and provides outputs to control said electronic ballast and to drive said light-emitting diode.

With reference to FIG. 2, the control signal on control line (39) to electronic ballast (32a) is preferably an analog voltage provided by controller (33) although any one of a number of control signal styles may be employed, such as, by way of example, analog voltage, current loop, digital pulse-width modulation signal, pulse position modulation and serial data communications.

Figure 3:
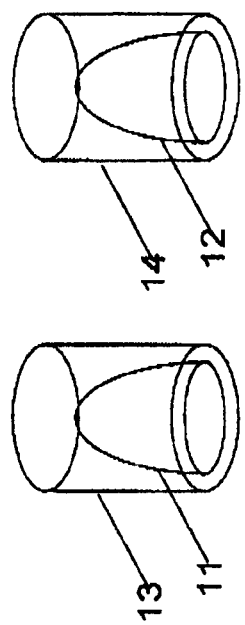
FIG. 3 shows the preferred embodiment for limiting the range of the communication between the light sources of the illumination system to limit the range between adjacent luminaires.

With reference to FIG. 3, an aspect of the invention related to limiting the range of infrared communications is now described. In the preferred embodiment the range of communication between luminaires is limited by the use of physical apertures. In one embodiment of a physical aperture a mask (13) of relevant shape may limit the area of illumination provided by an infrared light-emitting diode (11). In another embodiment a mask (14) of a relevant shape may limit the field of view of infrared photo-diode (12). It will be understood that other embodiments of apertures may be used.

Figure 4:
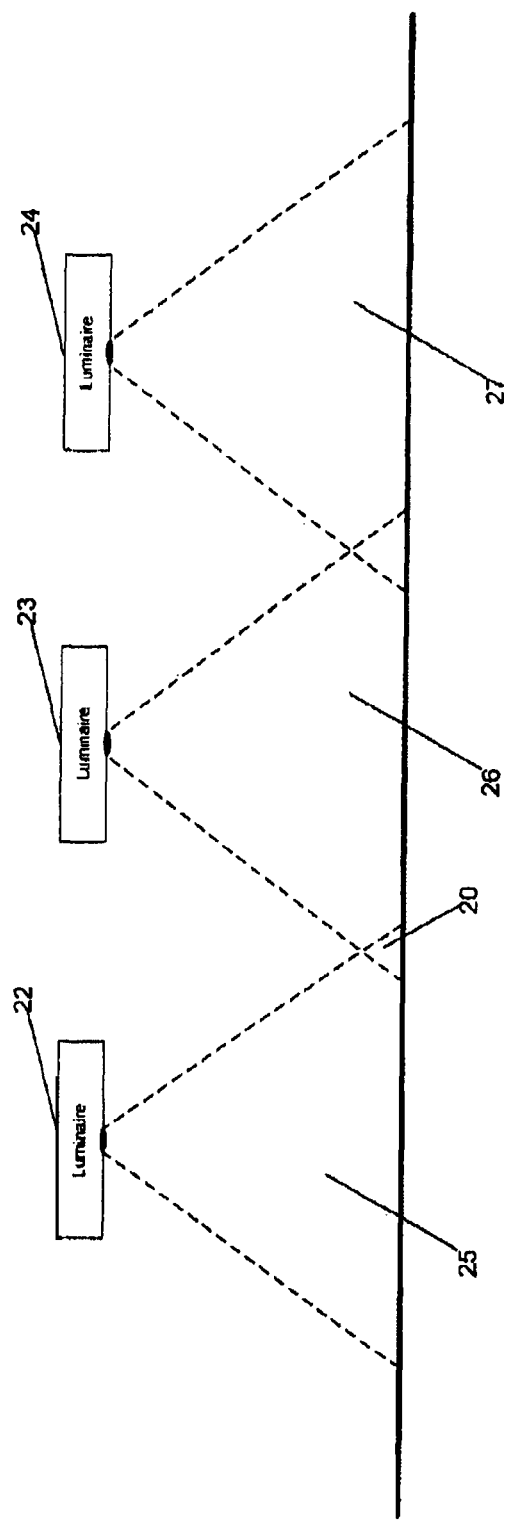
FIG. 4 shows the overlap region of the area of projection of a light-emitting diode within an illumination system and the field of view of an infrared sensor.

FIG. 4 shows the overlap region (20) of the area of projection (25) of a light-emitting diode associated with a transmitting luminaire (22) and the field of view (26) of the photodiode associated with a receiving luminaire (23). It can be seen therefore that the receiving luminaire (23) can receive infrared transmissions from the transmitting luminaire (22) whereas a more distant luminaire (24) cannot.

The method preferably incorporates a calibration process for setting baseline values for dynamically controlling the operating of luminaires in a particular system. In a first step of the calibration process, a calibration timer commences a calibration period. When the calibration period expires, coded "calibration" signal is transmitted. The calibration signal reflected from a surface, such as a floor or other reflecting surface, is sensed. The received power level is indicative of the reflectivity of the surfaces, which is important for the optimal operation of the lighting system. Preferably, the sensed power level is measured and compared to a threshold level that is indicative of sufficient, but not excessive power required for transmission of a signal between adjacent or nearby luminaires. According to the system needs, the power level may be adjusted to transmit a signal only to an adjacent luminaire(s), or it may be adjusted for the range to include transmission to a nearby luminaire(s) as well as an adjacent luminaire(s). The power output of a transmitted signal based on the received power level relative to the threshold value may then be selected. The timer may be resent, and a unit then transmits at the new power level. Preferably, this process is repeated periodically to dynamically adjust for changes in the reflectivity of surfaces within the illumination area.

With reference to FIG. 5, an exemplary implementation of the algorithm in each light source is described as follows.

The flow chart of FIG. 5 shows the method comprising of a number of steps involving a plurality of states, for example Standby (41) and SubjectPresent (43), and a number of transitions that define the exit criteria, and entrance criteria for the transition from one state into another, for example tStandby (57), which is the transition into the state Standby (41) and transition tSubjectPresent (42), which is the transition into state SubjectPresent (42). Each state has just one entrance transition, and potentially a multitude of exit transitions. Each state also has a number state variables, Illumination (61), which defines the level of light output in that state, Timer (62), which defines which timer, if any, is to commence counting down upon entering the given state, and Transmit signal level (63), which defines the level of the signal broadcast, if any, to send out to neighboring light sources while in the given state. These state variables all may, or may not, be configurable by the user, or may be fixed values.

The following examples of a series of transitions between states serves as an explanation as to how the steps of the algorithm shown in FIG. 5 may be implemented, from the point of view of a single light source, acting within the light system, as shown in FIG. 1. Starting from Standby (41), the light source can enter any of the three states: SubjectPresent (42), Level1Active (49), or Level2Active (54), depending on the status of the three transition parameters, sensing (58), Received signal level (59), and timer status (60). For example, if a subject is sensed, then the sensing parameter will become "Subject Present", and the transition tSubjectPresent (42) will be satisfied, and the light source will enter the state SubjectPresent (43). In this state, the light source will configure its Illumination level to PresenceLux (61). It will not initiate a timer (62) in this state due to the fact that the subject is present, and a transition will not occur until the subject becomes absent. In said SubjectPresent state it will transmit a level 1 signal (63) to neighboring light sources. When the sensing parameter becomes "absent", the transition tPresentLuxDwell (44) will become valid, and the state will change to PresentLuxDwell (45). This state is classified as a dwell or timer state, similar to Lev1Dwell (51), and Lev2Dwell (56). In said state PresentLuxDwell, the illumination level from the prior state remains, and the timer Tpl (62) commences countdown, which when it expires, will initiate the transition tLowLuxDwell (46), and the state will change to LowLuxDwell (47). Upon entry into this state, the Illumination level will be set to LowLux, and the timer will commence counting down from Tll. Upon expiry of the timer, and in the absence of any signals from neighboring light sources, the transition tStandby (57) will become valid, and the state will change to Standby (41), and the associated state variables will change appropriately. If in this state, a receive signal of level 1 is received, and in the absence of sensing presence of a subject, the transition tLevel1Active will become valid, and the state will become Level1Active (49). This transition can be accessed from any of the states that are attached to it by a line, namely, states PresentLuxDwell (45), LowLuxDwell (47), Lev1Dwell (51), Level2Active (54), and Lev2Dwell (56). Similarly, the higher hierarchical state SubjectPresent (43), can be accessed by transition tSubjectPresent (42) in any of the aforementioned states, plus the state Level1Active (49).

Similarly the lower level state, Level2Active (54) is accessible by a number of states, but is subject to the hierarchical rules that prioritize sensing the presence of the subject (58), or receiving a level 1 signal, as shown in the transition tLevel1Active (48).

The above description describes the behavior of any one of the light sources within a network comprising a system. At the system level, the various light sources will be in any of a number of states, depending on the status of the subject presence detector. If a subject of interest is detected, then the receive signal level is irrelevant, however if absence is detected, then the state that the light source is in depends upon the highest priority level of signal received from neighboring light sources.

The algorithm shown in FIG. 5 is limited to level-two signals, but the same method could be applied to an unlimited number of levels. Further, a number of preconfigured parameters are presented, but there are multiple variations of the preconfigured parameters, where some could be fixed, or the algorithm could be modified such that the parameters are in effect designed out of the system. Similarly, a number of transitions are detailed in the exemplary algorithm, however, some of the these may in fact change depending on various implementations of the algorithm. For example, the transition to state Level2active from state Level1Dwell may retain the Illumination Level1lux, even though the illumination specified for state Level2active, Level2lux may differ from Level1lux. Each transition of an illumination level may incorporate a preconfigured, or fixed ramp time between illumination levels to minimize the discomfort of the subject due to rapid changes in illumination level. The illumination parameter may also be a fixed or absolute amount of light output from the light source, or an amount of light required to bring the overall light in the area up to a point of required illumination, implemented by example as a daylight-dimming system, utilizing a control system that measures ambient light, and controls light output so as to bring the overall combined natural and artificial light up to the desired level.

We claim:
1. An apparatus for controlled lighting comprised of:
at least two light sources;
a plurality of sensors each comprising a corresponding sensing component configured to sense at least one corresponding characteristic of a corresponding sensing region and to generate at least one corresponding output;
a plurality of transmitters for transmitting wireless signals to one or more receivers;
a plurality of receivers for receiving wireless signals from one or more of the plurality of transmitters;
a plurality of controllers for controlling at least one corresponding light source, wherein each of the controllers is configured:
(a) to control the illumination output of one or more corresponding light sources in dependence on the at least one output of the at least one sensing component and first information received from one or more others of the transmitters via corresponding wireless signals received by a corresponding one of the plurality of receivers, the received first information representing a characteristic of a corresponding sensing region sensed by a corresponding sensing component and directly representing a relative spatial separation from the corresponding sensing region; and
(b) upon receiving at least one output from a corresponding said sensing component, to generate corresponding second information dependent on the output of the corresponding sensing component; and
(c) upon receiving the first information from the one or more others of the transmitters, to generate corresponding second information from the first information received from the one or more transmitters, the generated second information directly representing a relative spatial separation from the corresponding sensing region that is greater than the relative spatial separation directly represented by the first information from which the second information was generated; and
(d) to transmit the second information generated at step (b) and step (c) via corresponding wireless signals transmitted by a transmitter for receipt as the first information by one or more of the plurality of receivers.

2. The lighting control apparatus of claim 1, wherein the first information is indicative of a corresponding first one of a set of different levels, and the second information is indicative of a corresponding second one of the set of different levels.

3. The lighting control apparatus of claim 2, wherein the different levels correspond to respective different levels of illumination output.

4. The lighting control apparatus of claim 1, wherein the controller is configured to control the illumination output of the corresponding light sources to provide a corresponding level of illumination output selected from a set of at least three different levels of illumination output.

5. The lighting control apparatus of claim 1, wherein the first information is indicative of respective first spatial separations of other receivers from the transmitter and at least one sensed characteristic of respective sensing regions, and the second information is indicative of second spatial separations such that each said second spatial separation is greater than a corresponding one of the first spatial separations.

6. The lighting control apparatus of claim 1, wherein the at least one output of the at least one sensing component includes an output indicative of human presence or absence, and when said output indicates human presence, the second information transmitted by the transmitter includes information indicating to other receivers that at least one sensor has detected human presence.

7. The lighting control apparatuses of claim 1, wherein the first information includes information indicating that at least one other sensor has detected human presence, and the second information transmitted by the transmitter includes information indicating to receivers that at least one sensor has detected human presence.

8. The lighting control apparatuses of claim 7, wherein the second information transmitted by the transmitter and indicating to receivers that at least one sensor has detected human presence includes information indicative of a spatial separation of the sensor from the at least one receiver that detected human presence.

9. The lighting control apparatus of claim 1, wherein the first information received from one or more receivers includes information indicating that the one or more sensors have detected human presence and being indicative of respective distances from the sensors to the one or more receivers, and the second information transmitted by a further transmitter includes information indicating to a further one or more receivers that the one or more sensors have detected human presence and being indicative of respective distances from the one or more sensors to the further one or more receivers.

10. The lighting control apparatus of claim 1, wherein the first information received from one or more transmitters includes information indicating that the one or more sensors have detected human presence and representing integer values indicative of respective distances from each sensor to the one or more receivers, and the second information transmitted by the transmitter includes information indicating to further receivers that the one or more sensors have detected human presence and representing updated integer values indicative of respective distances from the said sensors to the one or more said receivers.

11. The lighting control apparatus of claim 1, wherein the first information received from one or more transmitters represents occupancy messages indicating that the one or more sensors have detected human presence and including numeric values representative of respective numbers of times that the occupancy messages have been forwarded, and the controller is configured to increment the numeric values and to forward the occupancy messages to other receivers, wherein the forwarded occupancy messages include the incremented integer values.

12. The lighting control apparatus of claim 1, wherein the controller is configured to control the corresponding light sources in dependence on:
i. the detection of human presence in the corresponding sensing region of the sensor; and
ii. the detection of human presence by at least one other sensor and a corresponding spatial separation of the receiver from the at least one other sensor that detected said human presence.

13. The lighting control apparatus of claim 12, wherein the at least one output of the at least one sensing component includes a second output indicative of an ambient light level of a corresponding sensing region, and the controller is configured to control the corresponding light sources based on the second output.

14. The lighting control apparatus of claim 12, wherein the controller is configured to control the corresponding light source based on respective times of the detection of human presence by the sensor and by the at least one other sensor.

15. The lighting control apparatus of claim 1, wherein the wireless transmitter is configured to limit the range of the transmitted wireless signals so that, in use, the transmitted wireless signals will be received only by one or more receivers within a corresponding distance from the transmitter, and not by other receivers.

16. The lighting control apparatus of claim 1, wherein the wireless signals are infrared optical signals.

17. The lighting control apparatus of claim 1, wherein the one or more corresponding light sources are disposed within a corresponding common housing or luminaire.

18. The lighting control apparatus of claim 1, wherein the controller is configured to control the one or more corresponding light sources so that the illumination generated by the corresponding one or more light sources generally decreases with increasing distance to the closest human presence detected by the sensor and/or by others of the sensors.

19. The lighting control apparatus of claim 1, wherein the controller is configured to control the one or more light sources by selecting an illumination output of the one or more light sources in dependence on:
  (i) the at least one output of the at least one sensing component; and
  (ii) the first information received from the transmitter.

20. A lighting control process for execution by a lighting control apparatus to control one or more corresponding light sources, the process including:
  receiving by receivers wireless signals representing first information from one or more transmitters, wherein the received first information represents a characteristic of a corresponding sensing region sensed by a corresponding sensor and directly representing a relative spatial separation from the corresponding sensing region;
  sensing by sensors at least one characteristic of a corresponding sensing region to generate at least one corresponding output; and
  controlling the one or more corresponding light sources in dependence on:
    (i) the at least one output of the at least one sensing component; and
    (ii) the first information received from the one or more transmitters;
  upon receiving at least one output from a corresponding said sensor, generating corresponding second information in dependence on the first information received from the one or more transmitters and the at least one corresponding output;
  upon receiving the first information from the one or more others of the transmitters, generating corresponding second information from the first information received from the one or more transmitters, the generated second information directly representing a relative spatial separation from the corresponding sensing region that is greater than the relative spatial separation directly represented by the first information from which the second information was generated; and
  transmitting wireless signals representing the second information for receipt as the first information by one or more other transmitters.

21. The lighting control process of claim 20, wherein the first information is indicative of a corresponding first one of a set of different levels, and the second information is indicative of a corresponding second one of the set of different levels.

22. The lighting control process of claim 20, wherein the different levels correspond to respective different levels of illumination output.

23. The lighting control process of claim 20, wherein said controlling includes causing the corresponding light sources to provide a level of illumination output selected from a set of at least three different levels of illumination output.

24. The lighting control process of claim 20, wherein the first information is indicative of respective first spatial separations of one or more transmitters from the receivers and at least one sensed characteristic of one or more respective sensing regions, and the second information is indicative of second spatial separations such that each said second spatial separation is greater than a corresponding one of the first spatial separations.

25. The lighting control process of claim 20, wherein the at least one output includes an output indicative of human presence or absence, and when said output indicates human presence, the second information transmitted by the transmitter includes information indicating to one or more receivers that the transmitter has detected human presence.

26. The lighting control process of claim 25, wherein the at least one output includes an output indicative of human presence or absence, and said controlling includes determining the illumination output of the one or more light sources by the detected human presence closest to the receiver.

27. The lighting control process of claim 20, wherein the second information transmitted by the transmitter includes information indicating to each of the receivers receiving the transmitted second information that at least one other of the sensors has detected human presence, and being indicative of a spatial separation of each said receiver receiving the transmitted second information from the at least one sensor that detected human presence.

28. The lighting control process of claim 20, wherein said controlling includes controlling the light source on the basis of the detection of human presence by the sensor and/or by one or more others of the sensors, respective distances to the one or more sensors detecting human presence, respective times associated with the detections, and ambient light levels.

* * * * *